Figure 1:
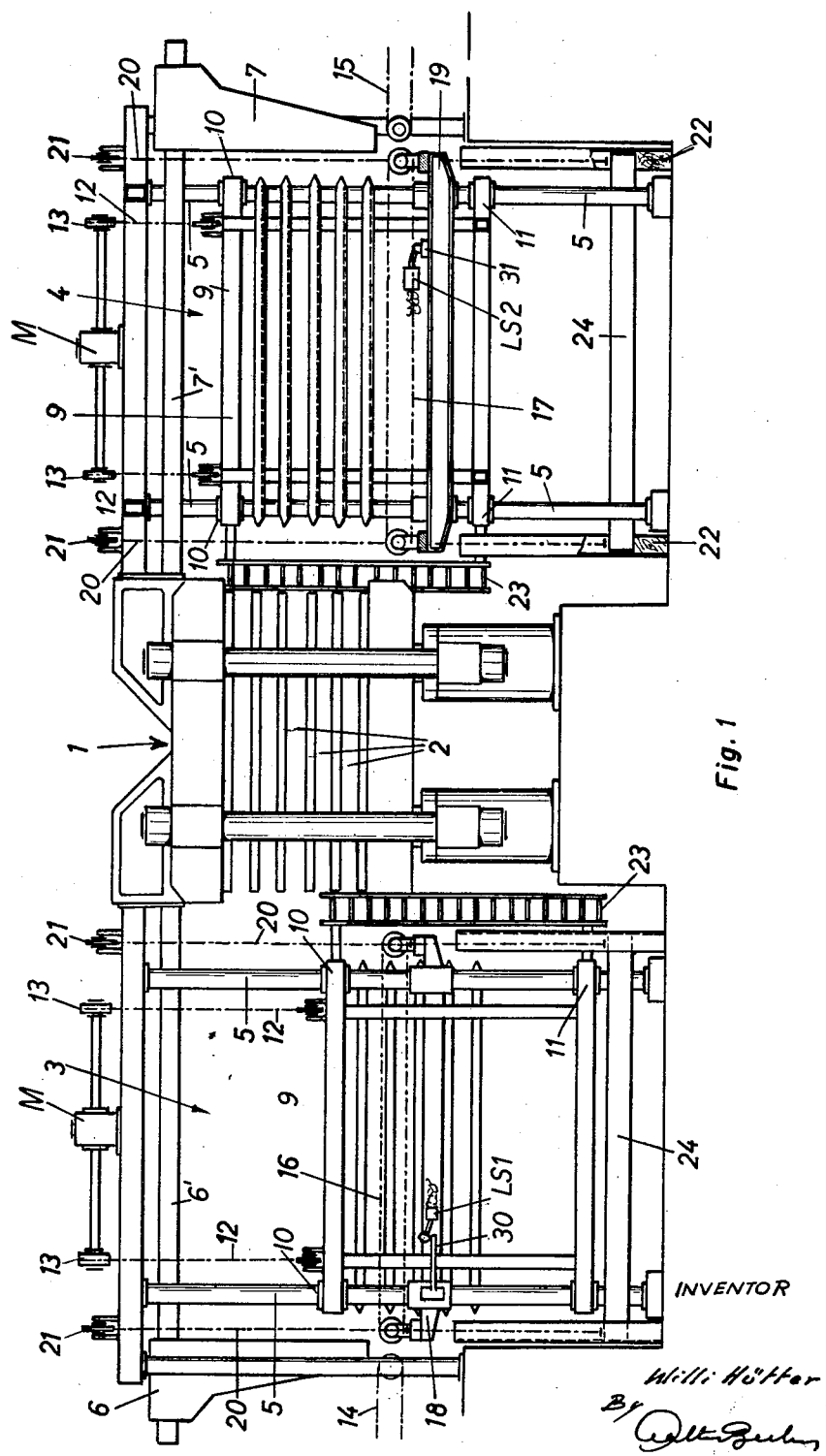

April 21, 1964 W. HÜTTER 3,129,827
DEVICE FOR CHARGING AND UNLOADING MULTI-PLATE PRESSES
Filed Nov. 7, 1960 3 Sheets-Sheet 2

INVENTOR
Willi Hütter

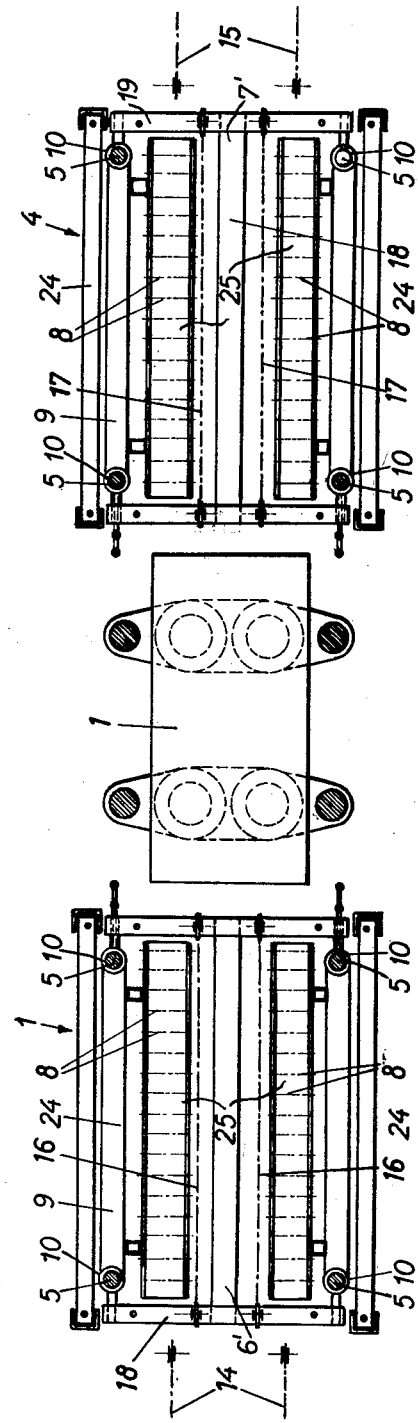

United States Patent Office 3,129,827
Patented Apr. 21, 1964

3,129,827
DEVICE FOR CHARGING AND UNLOADING
MULTI-PLATE PRESSES
Wilhelm Hütter, Krefeld, Germany, assignor to Niederrheinische Maschinenfabrik Becker & van Hüllen, Krefeld, Rhineland, Germany
Filed Nov. 7, 1960, Ser. No. 67,791
Claims priority, application Germany, Nov. 9, 1959
1 Claim. (Cl. 214—16.4)

The present invention relates to a device for charging and unloading multi-plate presses. In connection with the manufacture of veneer and plywood plates or panels, plates or panels of shavings and plates or panels and similar molded bodies in the synthetic material and rubber industry, primarily so-called multi-plate presses are employed according to which a plurality of heated pressing plates are arranged one above the other while the material to be pressed, which may be spread on supporting plates, is moved between said pressing plates and is then compressed. The loading and unloading of the press is effected mechanically, manually or semi or fully automatically. The fully automatic loading and unloading of the press is carried out in the following manner. The material to be pressed, for instance chip raw material for panels is placed on supporting plates. These plates are then moved in succession on a conveyor to the loading device of the press. A chain loader of the loading device then moves said supporting plates into the loading or charging device. The chain loader is journalled in the fixed frame of a charger or directly forms a part of the roller conveyor. A multi-shelf elevation is displaceable in the frame in vertical direction upwardly and downwardly and, in conformity with the number of shelves or decks of the press is provided with a plurality of roller gangs connected to both sides of the elevator. The elevator first occupies its lowermost position so that the first supporting plate moved into the charging device by the chain loader will, with the material thereon that is to be pressed rest above the uppermost roller gang. The elevator is then lifted the height of one shelf or deck so that in this way the supporting plate will be lifted the distance between two shelves and will be lifted off from the chain loader. Subsequently, the next supporting plate carrying material to be pressed is pulled into the elevator whereupon the elevator will again be lifted the distance between two shelves. This procedure will be repeated over and over again until the elevator has all of its shelves or decks loaded with supporting plates carrying material to be pressed.

As has already been mentioned, the roller gangs arranged one above the other in the elevator are connected to the sides of the elevator so that between the individual roller gangs there remains a wide gap. It is into this gap that a so-called charging beam may be moved, which charging beam is carried by the elevator frame and is adapted simultaneously to move all of the filled supporting plates between the pressing plates of the press. After the supporting plates have been moved between the pressing plates, the pressing operation proper takes place while simultaneously the charging elevator is lowered to its lowermost position so that it can be loaded again in the above described manner. On the other side of the press there is provided a device which, as far as its construction is concerned, corresponds to the charging device but in contrast to the latter serves for the simultaneous unloading of the supporting plates with the finished pressed panels or workpieces together with the supporting plates from the press. The pulling out of the supporting plates is likewise effected by means of a beam adapted to be moved between the roller gangs of the corresponding elevator. After the supporting plates with the finished panels thereon are moved out of the press and into the unloading elevator, the elevator is lowered stepwise while each time the unloading chain mechanism moves a finished panel and its supporting plate onto the succeeding transport roller conveyor which latter conveys the supporting plates and workpieces to a desired station, for instance, a storage place. The control of the individual movements in the proper sequence is effected electrically by means of relays or may also be effected in an appropriate manner by hand. Inasmuch as with this rather rough handling occasionally faulty switch movements could occur, there exists the danger, among others, that a partially loaded elevator will be lowered unintentionally so that the chain charger or chain discharger mechanism which occupies the level of the incoming or outgoing transport roller conveyor may be damaged or even destroyed. In such an instance the lowermost supporting plate would rest upon the chain charger or chain discharger mechanism and upon further lowering of the elevator, the lowermost supporting plate would engage the roller gang thereabove so that now the lowering force of the elevator would in its entirety act upon the chain mechanism which chain mechanism as well as the elevator would then be damaged by the load.

It is, therefore, an object of the present invention to provide a charging and unloading device for use in connection with multi-plate presses, which will overcome the above mentioned drawbacks.

It is another object of this invention to provide a charging and unloading device for use in connection with multi-plate presses, in which means are provided which will prevent any undesired or accidental movements of the basket.

These and other objects and advantages of the invention will appear more clearly from the following specification in connection with the accompanying drawings, in which:

FIG. 1 diagrammatically illustrates the side view of a multi-plate press with charging and unloading device in conformity with the present invention.

Figure 2:
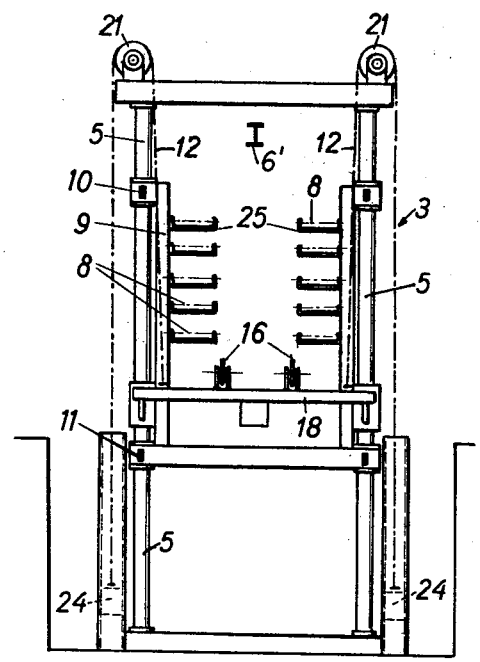

FIG. 2 diagrammatically illustrates an end view of a charging device according to the invention while the lifting and lowering device for the elevator as well as the charging beam has been omitted.

FIG. 3 diagrammatically illustrates a top view of the press according to FIG. 1 with charging and unloading device.

Figure 4:
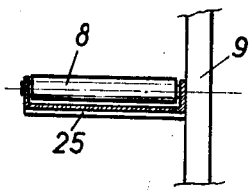

FIG. 4 is a diagrammatic illustration of the arrangement of the roller of a roller gang on one side of the elevator with protective plate therebelow.

General Arrangement

The present invention is characterized primarily in that the loading or unloading chain mechanism guided in the elevator frame is adapted to be displaced vertically independently of or automatically with the movement of the elevator. As a result thereof, the chain mechanism can move out of the plane of the transport roller path when the maintenance of this position, in case of an undesired movement of the elevator, would bring about a destruction of the elevator moving mechanism or of the elevator. More specifically, the chain loader mechanism in the elevator frame may be suspended on cables, chains or the like which pass over at least one roller while counter weights are arranged at the other end of said cables, chains or the like. The chain loader will thus hang balanced similar to a scale so that it will be lowered for instance during the lowering of the elevator when the latter engages the chain loader mechanism through moved-in supporting plates. In this connection, a mere carrying along force is required which causes a lifting of the counter weights. The force thus corresponds to the difference in weight between the loaded chain loader mechanism and the counter weights pertaining thereto.

Preferably, the counter weights are in conformity with the invention so arranged that they rest on a support when the chain loader mechanism is in the plane of the transport roller paths so that the normal position of the chain loader mechanism will adjust itself automatically and will be secured.

According to a further development of the invention, the chain loader mechanism may, at the level of the transport roller paths and with the elevator raised, rest on the guiding eyes extending around the guiding columns of the elevator frame so that the normal position will be assured by resting the counterweights on a support as well as by the engagement of the chain loader mechanism with abutments on the elevator. By arranging the chain loader mechanism so that the latter is adapted to be lifted and lowered, the advantage will be obtained that the loaded elevator together with the chain loader mechanism may be lowered and that following the lowering of the elevator, the associated press end side will be free and accessible to allow an inspection of the individual shelves of the press or to carry out the necessary operations between said shelves. The advantage consists in that now the press will also be accessible when the elevator is in loaded condition.

As a further safety measure, the present invention provides limit switches which stop the chain of the chain loader mechanism when the latter moves out of the plane of the conveyor roller path.

According to a further development of the invention, the distance between the press and the loading and discharging device is such that ladders may be inserted therebetween or may be suspended to the press in order to be able to have access to the press especially when the elevator is lowered, regardless whether the elevator is loaded or empty.

As further safety measure, the present invention provides protective plates below the individual roller gangs on both longitudinal sides of the elevator. These protective plates form a surface protection for the pressed material therebelow inasmuch as they prevent the dropping on the pressed material of drops, chips or the like. Thus, merely the central space between the roller gangs is free.

*Structural Arrangement*

Referring now to the drawings in detail, the multi-plate press, which is generally designated with the reference numeral 1, is equipped with a number of pressing plates 2 arranged one above the other and between which the material to be pressed—generally placed on supporting plates—is inserted and heat pressed. Arranged in front of press 1 is a loading device 3 while behind press 1 there is arranged the similarly designed discharging device 4. The devices 3 and 4 consist of the so-called elevator frame comprising substantially four columns 5 which are interconnected and braced by transverse struts. Arranged on the elevator frame is the support for the feeding or loading beam 6 and the discharging or unloading beam 7. These beams extend vertically downwardly and are adapted to be displaced in and opposite to the charging direction. The said feeding and discharging beams, when being displaced, extend between the roller gangs 8 of their respective elevators as shown more clearly in FIGS. 2 and 4. The roller gangs 8 are connected to the sides of elevator 9 which latter consists primarily of a box-shaped frame. The said elevator has upper guiding eyes 10 and lower guiding eyes 11 through which extend the columns 5 on which the elevator is movable in vertical direction. Elevator 9 is suspended on chains 12 passing over sprocket wheels 13 adapted to be driven by a motor M and supported by the frame of the elevator. The said motor is adapted to move the elevator vertically in a continuous manner from the bottom to the top or from the top to the bottom or may also move the elevator in steps in conformity with the level of the individual plates or shelves. The feeding of the loaded supporting plates into the press is effected by means of a roller conveyor 14, whereas the withdrawal of the pressed supporting plates is effected by means of a roller conveyor 15. When occupying its normal position, the loading and unloading chain systems or mechanisms 16 and 17 are located in the same plane as their respective roller conveyors 14 and 15. The chains of the chain systems 16 and 17 are supported by the horizontal support frames 18 and 19 which are suspended on the cables 20 extending vertically upward and passing over rollers 21 on the elevator frame and then extend vertically downwardly. The lower ends of the cables 20 are connected in pairs to the counter weights 24 extending along the longitudinal sides. The said counter weights 24 balance the weight of the chain systems 16 and 17. The size of the weights is such that it is slightly in excess of the weight of the chain systems when the latter are loaded with supporting plates and material thereon to be pressed. The support frames 18 and 19 of the chain systems 16 and 17 are guided along the columns 5 in a manner similar to the elevator 9.

Elevator 9 and frames 18 and 19 are movable vertically independently of each other. The lowering of the support frames 18 and 19 with the chain systems 16 and 17 is effected positively and automatically when the elevator 9 is being lowered while carrying a load. In this instance, the lowermost supporting plate in the elevator being moved will engage the pertaining chain systems 16 and 17 and will press the same downwardly while overcoming the difference in weight between the chain system and the counter weights therefor so that neither a destruction of the supporting plate and the material thereon nor a damaging of the chain system on the elevator will be possible.

As has been mentioned above, the counter weights 24 of the chain systems 16 and 17 will rest on supports 22 when the chain systems 16 and 17 are located in that plane in which the roller conveyors 14 and 15 are located.

Below the roller gangs 8 there are provided protective plates 25 one of which is shown in FIG. 4. The purpose of said protective plates 25 consists in preventing material from falling from the upper shelf onto the lower shelf, thereby making sure that no undesired change in the quantity of the material to be pressed will occur on the individual shelves or plates. The prevention of drops from falling out of the plates or shelves will assure an unchanged contents in the humidity of the material to be pressed.

The arrangement according to the invention furthermore comprises limit switches which will assure that the chain systems 16 and 17 will be switched off and remain switched off when the chain systems 16 and 17 are not located in their normal conveying position, namely in the plane of the paths of the roller conveyors 14 and 15.

These limit switches, LS1 and LS2, seen in FIGURE 1, are stationarily mounted and are only engaged by the brackets 30 and 31 on the frames 18, 19 of the chain system 16, 17 when the latter are in their normal working position. When, for any reason, the frames of the chain system are lowered from this normal working position, they leave the limit switches and movement of the chains of the chain mechanisms is prevented by preventing energization of the drive motors (not shown) therefor.

As will be evident from the drawings, the distance between the press 1 and the loading and discharging devices 3 and 4 is such that an intermediate space will be provided which will allow the mounting of a ladder 23. By means of such a ladder, it will be possible whenever desired to carry out repairs from the end sides of the press not only of the press itself but also of the loading and discharging devices, even when the elevators are loaded, because the elevators can also be lowered when loaded so that the end faces of the press 1 will be free.

In connection with unloading beam 7, this beam attaches to all of the plates at one time and pulls them as a unit from the press. For this purpose, some catch means would be provided for effecting the connection between beam 7 and the plates, and this could, of course, take many forms. No device of this nature is illustrated in the drawings, but it will be understood that a connection is established between the beam 7 and the several plates in order to pull the plates all out of the press at one time. A device of this nature is shown, for example, in the German Patent 938,889 of 1956.

After the pressing operation has been completed and press 1 has been opened, the discharge beam 7 becomes effective. Frame 9 of the discharging device 4 at this time has its stories adjusted to proper height with regard to the planes formed by the pressing plates of press 1, and the discharge beam 7 has moved to the press. The discharge beam 7 is designed as a pull beam and has means which engage extensions on the front transverse sides of the supporting plates, so that beam 7, when moving from the right-hand side of press 1 toward the unloading roller conveyor 15, pulls out of the stories all of the supporting plates with the material pressed thereon at one time, whereupon the supporting plates are conveyed to the roller gangs of the discharging device 4. At the end of the discharging operation, the discharge beam 7 occupies its FIG. 1 position, on the right-hand side outside the frame 9. The movement of the introducing beam 6 and the dicharging beam 7 is effected along the beams 6', 7' of FIG. 1.

As soon as the discharge arm 7 has reached the position indicated in FIG. 1, the transfer of the piled-up supporting plates with the pressed material thereon will be effected from frame 9 of the discharge device 4 to the conveyor roller gang 15. To this end, the supporting plane of the lowermost roller gang carrying a plate is moved downwardly into the plane of the feeder roller path 15. This is effected by correspondingly moving frame 9 of the discharging device 4. The said transfer is effected by means of a motor which is mounted on the frame of the discharging device 4 for driving the chain wheels 13.

As soon as a supporting plate with the pressed material thereon has been so moved by movement of frame 9, said supporting plate is grasped by chain system 17 and is transferred by the latter from the corresponding roller gangs to the feeder roller path 15.

In this way, all supporting plates piled up in the discharging device 4 are successively withdrawn from said discharging device. At the same time, the loading devices 13 are, story by story, filled with fresh supporting plates and material to be pressed so that a continuous cycle of operation is maintained.

The roller gang pairs provided for each story in the loading device 3, and also in the unloading device 4, are so spaced that in the center between the respective cooperating roller gangs the chain systems 16, 17 will have free movement, as will also the loading beam 6 and unloading beam 7.

It is, of course, to be understood that the present invention is, by no means, limited to the particular construction shown in the drawings but also comprises any modifications within the scope of the appended claim.

What I claim is:

In combination; a multi-plate press having vertically spaced superimposed plates, and a feeding and discharging arrangement for loading and unloading said press, said arrangement comprising frame means at each side of the press and attached thereto, multi-shelf elevator means vertically slidably mounted in each said frame means for upward and downward movement, motor means on each frame means connected to the pertaining elevator means to move the elevator means vertically, two rows of roller means respectively mounted on opposite sides of each of said elevator means with one row of roller means spaced in horizontal direction from the other row of roller means, each of said rows comprising a plurality of roller means arranged one above the other and spaced in vertical direction from each other in conformity with the spacing of the plates of said multiplate press, horizontal conveyor means for each elevator means vertically movable in the space between said rows of roller means of the pertaining elevator means, support frame means supporting each said conveyor means and vertically slidably mounted in the pertaining one of said frame means and movable in said frame means independently of said elevator means therein and also together with said elevator means, pulley means carried by said frame means, suspending means passing over said pulley means and having one end connected to the said support frame means of said conveyor means, counter-weight means connected to the other end of said suspending means, abutment means beneath said counter-weight means to stop the counter-weight means so the conveyor means is yieldably supported at a predetermined level slightly below the lowermost of said rows when the elevator means is in its uppermost position, means movable horizontally in the space between said rows of roller means and above said conveyor means for moving articles from the elevator on one side of the press into the press and for moving articles from the press into the elevator on the other side of the press, supply and discharge conveyors leading to the conveyor means on the one side of the press and from the conveyor means on the other side of the press, and limit switch means operatively associated with said conveyor means and normally engaged thereby and operable for causing the conveyor means to become inoperative for conveying when said conveyor means is moved downwardly from said predetermined level.

References Cited in the file of this patent

UNITED STATES PATENTS

| 2,702,678 | Flock | Feb. 22, 1955 |
| 2,972,423 | Thurnher | Feb. 21, 1961 |

FOREIGN PATENTS

| 433,778 | Great Britain | Aug. 15, 1935 |
| 599,659 | Great Britain | Apr. 17, 1948 |
| 763,375 | Great Britain | Dec. 12, 1956 |